May 5, 1936.　　　　　G. J. ZIEGLER　　　　　2,040,068
APPARATUS FOR PREPARING SOIL FOR SEEDING
Filed Aug. 4, 1934　　　3 Sheets-Sheet 2
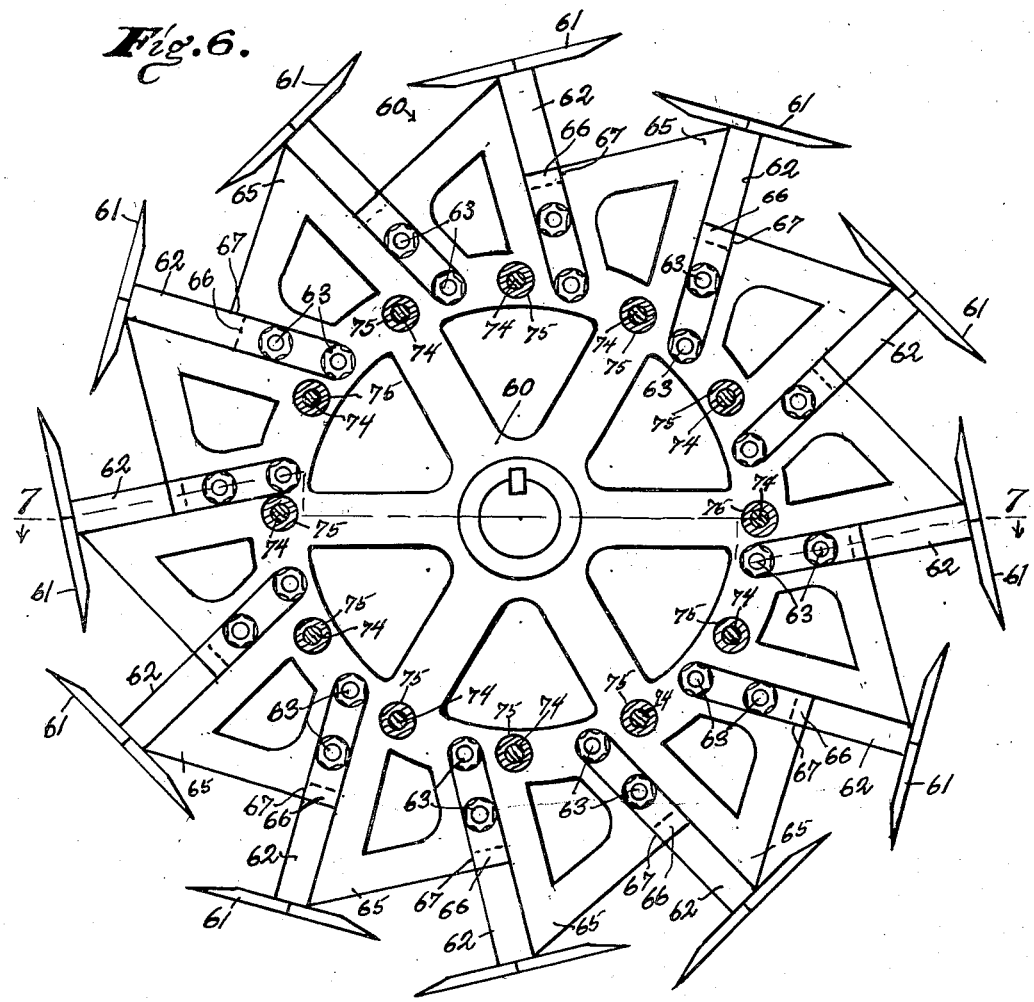
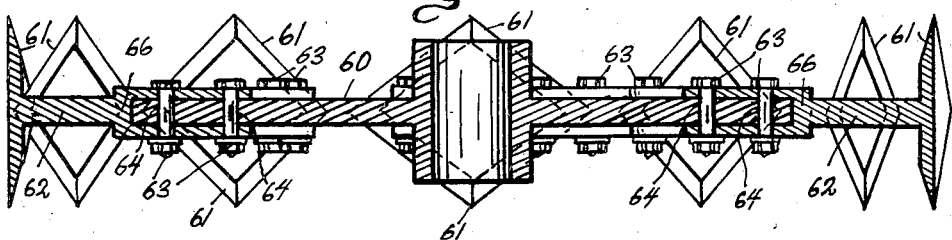
Inventor.
George J. Ziegler.
By
William M. Gentle
His Attorney.

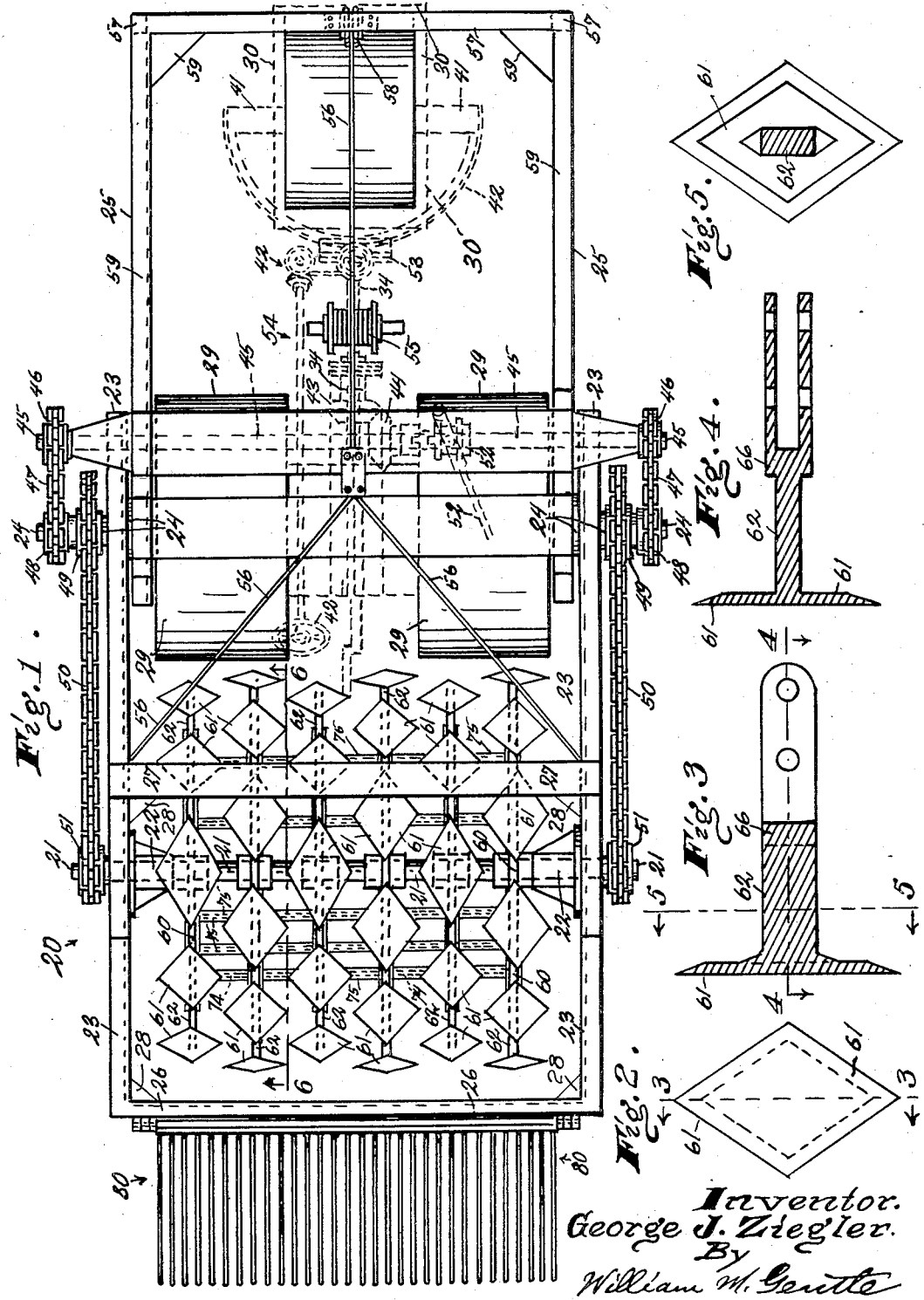

May 5, 1936. G. J. ZIEGLER 2,040,068
APPARATUS FOR PREPARING SOIL FOR SEEDING
Filed Aug. 4, 1934 3 Sheets-Sheet 3
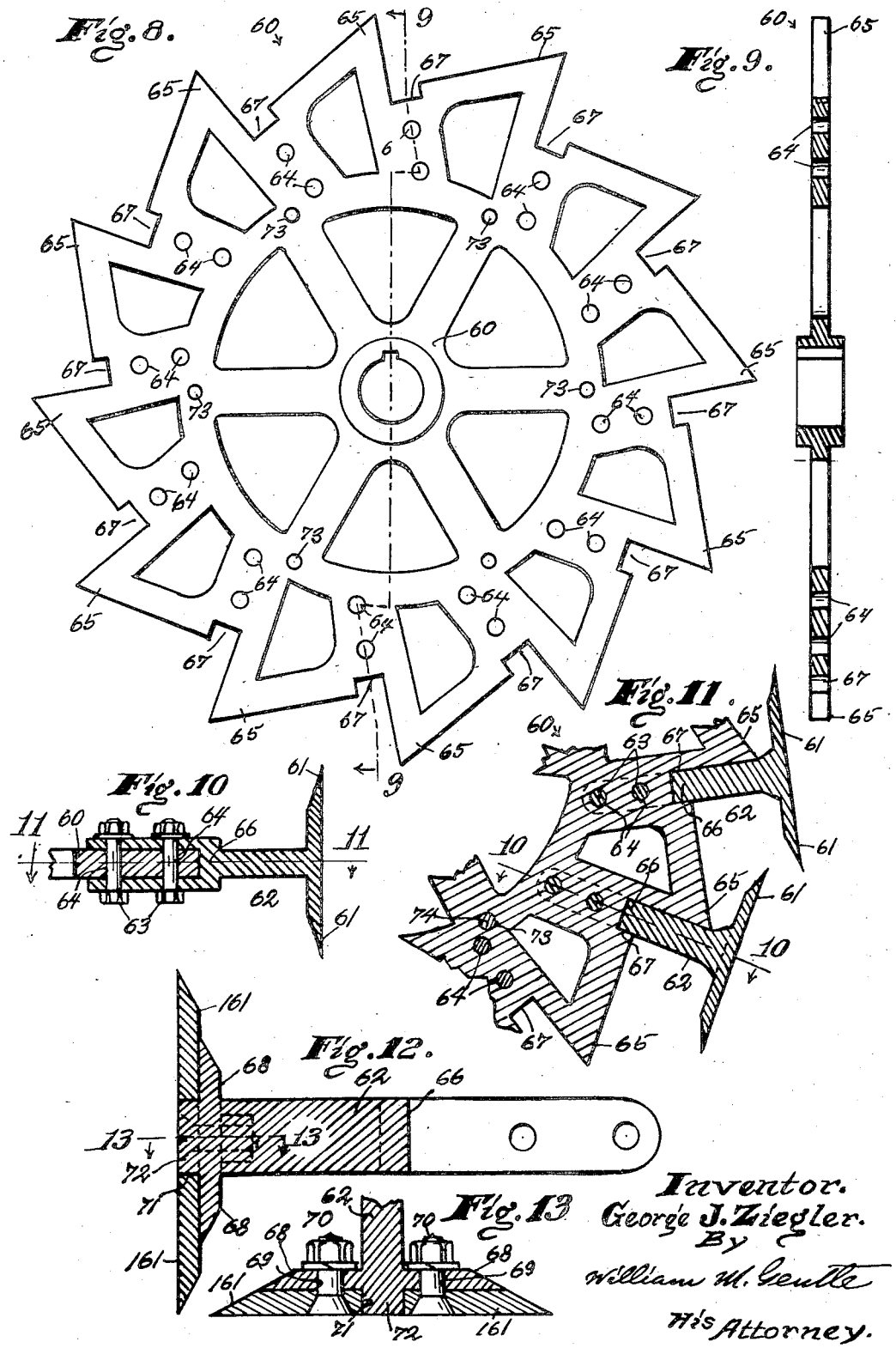
Inventor.
George J. Ziegler.
By
William M. Gentle
His Attorney.

Patented May 5, 1936

2,040,068

UNITED STATES PATENT OFFICE

2,040,068

APPARATUS FOR PREPARING SOIL FOR SEEDING

George J. Ziegler, Los Angeles, Calif., assignor of one-half to Conrad Wolf and one-fourth to William M. Gentle, both of Los Angeles, Calif.; George B. Shenk, guardian of said Conrad Wolf, infirm Application August 4, 1934, Serial No. 738,496

9 Claims. (Cl. 97—215)

This invention relates to means for preparing soil for seeding, and the principal object is to provide a tractor-actuated apparatus that can be operated by a single individual to finely pulverize and fertilize a relatively large tract of land in a correspondingly short time to thereby save both time and labor.

To that end I provide a tractor that carries a relatively large rotary cutter on its rear end arranged to cut a very wide swathe to the usual depth of deep plowing, and with means for driving the cutter at high speed and raising and lowering it to cut to any desired depth.

Another, and one of the principal objects of this invention, is to provide an apparatus that is capable of preparing seed-beds on a very large scale, and also adapted to destroy practically all of the insects and their eggs and larva both in the cover crop and soil while preparing the seed beds.

To that end I provide an apparatus with a cutter that can be driven at high speed to shred the cover crop so finely and also slice the soil in such thin slices that the above-mentioned pests will be destroyed.

A feature of invention is shown in constructing the apparatus so that in addition to slicing and pulverizing the soil, it also shreds the cover crop, such as straw stubble, corn-stalk, grass, weeds and the like, and mixes the shredded material with the pulverized soil to fertilize it.

Another feature of invention is shown in providing the apparatus with means for rolling down the cover crop so it is crushed and laid flat on the ground in a position in which the cutter can more effectively shred it.

Another feature of invention is shown in providing the rotary cutter with skeleton disks each carrying its individual shanks and cutter blades, and teeth integral with the disks for reinforcing the shanks so that when operating in very hard soil the shanks will not be liable to bend or break.

Another feature of invention is shown in securing the shanks to the disks so thin forked ends are seated centrally on the peripheries thereof and inclined so they can be reversed to reverse the position of the double-pointed blades; and also so that the blades are held in a proper position on the cutter to shred the cover crop and also slice the soil.

Another feature of invention is shown in pivotally mounting the bell cranks that support the cutter slightly above the axis of the tractor drive wheels so that when traveling over undulating uneven ground the cutter will neither cut too deep nor shallow, but will travel at a relatively uniform depth that is governed by the up and down movements of the drive wheels.

Other objects, advantages and features of invention that have not been hereinbefore mentioned may appear in the drawings of the apparatus and detailed description thereof.

The accompanying drawings illustrate the invention, in which:

Figure 1 is a plan view of a soil slicing and cover-crop shredding apparatus that is constructed in accordance with this invention, parts shown diagrammatically and semi-diagrammatically.

Fig. 2 is a front end view of one of the double-pointed cutter blades.

Fig. 3 is a section on line 3—3, Fig. 2, showing the cutter blade integral with the forked shank.

Fig. 4 is a section on line 4—4, Fig. 3.

Fig. 5 is a section on line 5—5 of Fig. 3.

Fig. 6 is an enlarged section on line 6—6 of Fig. 1, parts omitted, and showing the detailed construction of one of the skeleton disks and its cutter blades.

Fig. 7 is a section on staggered line 7—7, of Fig. 6, with the tie-rods and other parts omitted.

Fig. 8 is a side elevation of one of the skeleton disks detached from the apparatus, showing its peripheral teeth and sockets.

Fig. 9 is a section on the staggered line 9—9 of Fig. 8.

Fig. 10 is a fragmental section on line 10—10 of Fig. 11.

Fig. 11 is a fragmental section on line 11—11 of Fig. 10 showing how the forked ends of the shanks are inserted into the peripheral sockets of a skeleton disk and how the disk teeth engage the shanks to reinforce them; and also showing the double pointed blades integral with their shanks.

Fig. 12 is a sectional view of a detached forked shank showing it provided with a detachable reversible double-pointed blade.

Fig. 13 is a fragmental section on line 13—13, Fig. 12, showing in detail how the detachable and reversible blade is secured to the shank.

In detail my apparatus for preparing soil for seeding includes a rotary cutter 20 that is mounted on a shaft 21 that is secured by suitable bearings 22 to the bottom rails of a pair of bell cranks 23 that have their forward ends mounted on the axles 24 that are secured to the sides of the tractor frame 25.

The bell cranks 23 are connected by the cross beams 26 and 27 and have suitable braces 28 so they are very strong and rigid, and can move together when actuated.

The frame 25 is supported on the drive wheels 29 and guide wheel 30 that are in the form of rollers and are spaced so that in forward travel they roll down and crush a cover crop such as grass stalks and the like in advance of the rotary cutter so it can more effectively shred the crop and mix it with the pulverized soil that is sliced and pulverized.

The drive wheels 29 are preferably connected to an engine; and are controlled and driven in substantially the same way as the drive wheels are driven that are shown in my United States Patent No. 1,964,779, dated July 3, 1934. It is understood, however, that they can be driven in any desired way.

The guide wheel 30 is mounted in a swiveled bearing 41 that is turned by the steering mechanism 42 shown by dotted lines in Fig. 1. The means for driving the wheels 29 and steering the wheel 30 are old and for that reason they are indicated only diagrammatically.

The engine shaft 34 is provided with a bevel gear 43 that meshes with a bevel gear 44 on a cross shaft 45, that has sprocket wheels 46 on its outer ends that are connected by chains 47 with sprockets 48 on the axles 24.

The sprockets 48 are integral with other and larger sprocket wheels 49 on the axles 24 so they are driven together; and the wheels 49 are connected by sprocket chains 50 with sprocket wheels 51 on the shaft 21 by means of which the cutter 20 is driven.

It is understood that the tractor wheels can be driven at various speeds either forward or backward as shown and described in my United States patent hereinbefore referred to, and also that the apparatus is provided with suitable clutches 52 and 53, whereby the tractor can be actuated independently of the cutter or vice versa.

The bell cranks 23 are raised and lowered by a hoist 54 that is diagrammatically shown in Fig. 1. It includes a drum 55 that is connected by a cable 56 with upper ends of the bell cranks 23 so that when the drum is actuated it will raise and lower the cutter or the drum can be operated to hold the cutter in any adjusted position.

Any desired hoist can be used that will raise, lower or hold the hoist in a desired position. As such a hoist is old and well known, it is not described herein in detail, and it can be driven either by an engine or by a separate motor.

The frame 25 is provided with front standards 57 that carry a pulley 58 at their upper ends over which the cable 56 is extended and these standards have suitable braces 59 so they can easily support the weight of the cutter 20 and associated parts.

From the foregoing it is obvious that the cutter can be raised to an idle position in which it can be transported from place to place or lowered to shave the ground or to slice the soil to a depth to or below that usually displaced by deep soil-breaking plows.

The apparatus includes a plurality of saw tooth skeleton disks 60 each carrying its individual double pointed blades 61 that are mounted on individual shanks 62 that are secured to the disks 60 by the bolts 63.

The bolt holes 64 are in pairs and are arranged so the bolts 63 secure the shanks in lines that are tangent relative to the axle 21; and also so a side of each shank engages the front face of its respective tooth 65, so the teeth extend along one side of the shanks to adjacent the blades, and on a side that is opposite to that on which the cutting strains and shocks are applied when slicing the soil.

The teeth 65 are integral with the disks 60 and are arranged so they engage and reinforce the shanks 62 so they will not be bent or broken when their blades come into contact with very hard soil.

The shanks 62 are forked and extended over the disks so the butts 66 thereof are seated in the peripheral recesses 67 of the disks. By their construction the shanks are very rigidly secured to the disks and reinforced; so they can easily be turned over to reverse the position of the double-pointed blades, and when turned over the shanks will be reinforced as in the first instance.

Preferably the blades 61 are integral with their shanks, it being understood of course that they can be otherwise secured; and as indicated in Figs. 12 and 13.
In these figures the shank 62 is provided with a false blade 68 with bolt holes 69 therethrough for bolts 70 that secure the double pointed blade 161 to the shanks. In this instance the blade 161 has a center rectangular opening 71 therethrough into which an extension 72 of the shank 62 is extended.

With parts so arranged the extension 72 is designed to take the strains of soil slicing off of the bolts 70; and by this construction the double pointed blades can be reversed without reversing the shanks.

It is obvious that various forms of soil disintegrating blades can be designed and secured to the shanks 62, but for the sake of brevity only two forms of blades are shown.

Preferably the disks 60 have spaced holes through which cross rods 74 are extended and these rods having spacing sleeves 75 thereon, which parts are arranged to reinforce the disks against side thrusts; and also the sleeves in their rotation help to break up and pulverize the soil sliced by the blades.

The disks 60 are secured to the shaft 21 so that the blades on three of them are slightly in advance of corresponding blades on the other three disks, as illustrated in Fig. 1.

Preferably, there are twelve double pointed blades to each disk so that at each revolution of the cutter seventy-two slices are cut from the soil and thrown against the shanks and spacing sleeves to be broken up or disintegrated; and also the shanks are arranged centrally relative to their respective disks and blades so that as the soil is sliced the shanks split the slices into parts that are thrown sidewise against the sides of adjacent disks that are of skeleton form to aid in pulverizing the sliced soil.

The thickness of the slices of soil depends entirely upon the speed of forward travel of the apparatus and the speed at which the rotary cutter is driven.

In land greatly infected with harmful insects such as locust, grasshoppers, boll weevil, corn bore, cut-worms and the like, the soil can be sliced in such thin slices that practically all such pests can be destroyed, thereby saving for human consumption the thousands of tons of food material that heretofore have been destroyed annually by these pests.

After the soil is sliced and pulverized in the rotary cutter it is thrown back against a spreader 80 which preferably includes a plurality of spring teeth arranged to aid in breaking up the sliced soil and leveling it in a soft smooth bed ready for seeding.

Spring teeth are old and much used for the foregoing purpose, and for that reason the spreader is shown semi-diagrammatically and not described in detail.

In operation the apparatus is driven forward with the cutter lowered to the depth to which the soil is to be disintegrated and driven at a speed in which the soil will be sliced as hereinbefore described.

As the tractor moves forward it rolls down and crushes the cover crop such as weeds, corn stalks, stubble and the like, thereby laying it flat on the ground in position for the blades to shred or cut it in short lengths suitable for mixing with the soil to fertilize it.

From the foregoing it will be obvious that the cover crop can be shredded, the soil pulverized, and the harmful insects destroyed on a large scale within a short time with a minimum amount of labor in which only one person need be employed.

I claim as my invention:

1. An apparatus for preparing soil for seeding, including a disk, blades, forked shanks to which said blades are secured, said shanks secured to said disk so the butts thereof are extended in to peripheral recesses in said disks, teeth on said disk for reinforcing said shank to adjacent their outer ends and means for rotating said disk to cause said blades to slice the soil.

2. An apparatus for preparing soil for seeding, including disks having spaced teeth on and sockets in the periphery thereof, blades, shanks to which said blades are secured, said shanks having inner forked ends, the butts of which are extended into said peripheral sockets that aid in holding said shanks seated on the periphery of said disk and also so said teeth reinforcingly engage said shanks, and means for rotating said blades to cause them to slice the soil.

3. An apparatus for preparing soil for seeding, including disks having spaced teeth thereon and sockets in the periphery thereof, double-pointed reversible blades having rectangular openings therethrough, shanks to which said blades are secured, said shanks having inner forked ends, the butts of which are extended into and secured in said peripheral sockets so said teeth reinforcingly engage said shanks, false blades integral with the outer ends of said shanks; rectangular extensions integral with said false blades, and oppositely arranged bolts for securing said blades to said false blades, said extensions arranged to take the soil-cutting shock off of said bolts.

4. An apparatus for preparing soil for seeding, the combination of disks having spaced teeth thereon and sockets in the periphery thereof, double-pointed reversible blades, shanks to which said blades are secured, said shanks having inner forked ends, the butts of which are extended into and secured in said peripheral sockets so said teeth reinforcingly engage said shanks on a side opposite to that on which the soil-cutting strains and shocks are applied, cross rods extending through said disks, spacing sleeves on said rods, means for rolling down the cover crop in advance of said blades so it can be more evenly shredded by said blades, and other means for rotating said blades to cause them to slice the soil and mix it with the shredded cover crop.

5. An apparatus for preparing soil for seeding, including a skeleton disk, shanks secured to said disk so they are aligned centrally therewith and tangentially therefrom, teeth integral with said disk between which said shanks are seated said teeth arranged to reinforce said shanks out to adjacent their outer ends, a reversible two-pointed blade for each individual shank thereof, and means for rotating said disk to cause said blades to shred the cover crop and slice the soil.

6. An apparatus for preparing soil for seeding including a disk having peripheral teeth, shanks having forked ends seated on the periphery of said disk between the teeth thereof and secured thereto, blades on the outer ends of said shanks, and means for rotating said disk to cause said blades to slice the soil.

7. An apparatus for preparing soil for seeding including a shaft, a plurality of disks secured to said shaft, teeth to said disks, shanks having forked ends that are seated on the peripheries of said disks between the teeth thereof and secured thereto so they extend centrally and outwardly therefrom, cutter blades on the outer ends of said shanks, and means for rotating said disks to cause said blades to slice the soil.

8. An apparatus for preparing soil for seeding including a shaft, a plurality of spaced disks secured to said shaft, teeth to said disks, shanks having forked ends seated on the peripheries of said disks and between the teeth thereof so that said teeth reinforce said shanks, double-pointed blades on the outer ends of said shanks, means for securing said shanks to said disks so they are reversible to reverse said blades and means for rotating said disks to cause said blades to slice the soil.

9. An apparatus for preparing soil for seeding including a shaft, a plurality of skeleton disks secured to said shaft, peripheral teeth to said disks, shanks having forked ends seated between the teeth of said disks so they are reinforced by said teeth, bolts for securing the forked ends of said shanks to said disks so said shanks extend outwardly from the peripheries of said disks, reversible double-pointed cutter blades secured to the outer ends of said shanks, spacing sleeves secured between said disks and means for rotating said shaft to cause said blades to slice the soil, said blades and shanks arranged to split the slices of soil and throw the parts sidewise against the sides of adjacent disks and against said sleeves to disintegrate the soil.

GEORGE J. ZIEGLER.